United States Patent [19]

Inoue

[11] Patent Number: 5,317,503
[45] Date of Patent: May 31, 1994

[54] APPARATUS FOR CALCULATING A REPAIR COST OF A DAMAGED CAR

[76] Inventor: Isao Inoue, 8-12, Oide-cho, Nishinomiya-shi, Hyogo-ken, Japan

[21] Appl. No.: 858,951

[22] Filed: Mar. 27, 1992

[51] Int. Cl.⁵ .............................................. G06F 15/21
[52] U.S. Cl. ............................. 364/400; 364/464.01; 364/401
[58] Field of Search ............... 364/400, 401, 402, 406, 364/464.01

[56] References Cited

U.S. PATENT DOCUMENTS

| | | | |
|---|---|---|---|
| 4,435,769 | 3/1984 | Nagano et al. | 364/464.01 |
| 4,899,292 | 2/1990 | Montagna | 364/401 |
| 5,128,859 | 7/1992 | Carbone et al. | 364/401 |
| 5,146,404 | 9/1992 | Calloway et al. | 364/401 |
| 5,189,606 | 2/1993 | Burns et al. | 364/401 |

OTHER PUBLICATIONS

Body Shop Business, vol. 10, No. 10, Sep. 1991, Training and Education, Repairing GM's ABS-VI; Profiting from Chassis Work pp. 54–55.

*Primary Examiner*—Robert A. Weinhardt
*Attorney, Agent, or Firm*—Wenderoth, Lind & Ponack

[57] ABSTRACT

Necessary information in an estimate of repair cost of a damaged car, for example, damage types, repair work items, parts names, values of repair cost are stored. By displaying these information on a screen and selecting necessary items for a repair work, an estimate of repair cost can be made with convenience, accuracy, efficiency and without error. By displaying an illustration of a part on the same screen where data of the part are displayed, an accurate estimate is realized. Further, providing a sheet wherein a part and a work item and so on are described, the estimate is carried out by inputting a code number. Such a configuration prevents an estimate omission. By using, for example, a Compact Disk which has a large storage capacity as a recording medium, a large amount of information is stored.

6 Claims, 28 Drawing Sheets

SELECT DAMAGE TYPE

FRONT SEVERE DAMAGE         REAR SEVERE DAMAGE

FRONT MIDDLE                 REAR MIDDLE
DAMAGE                       DAMAGE
FRONT SLIGHT                 REAR SLIGHT
DAMAGE                       DAMAGE

SIDE DAMAGE COATING WORK

SELECT BY ↑↓ , DETERMINE BY SPACE, PROCEED BY F1
OK → F1    CANCEL/PRIMARY MENU → F10

Fig. 4

REPAIR OF
CAR BODY

⊆ WORK A1, WORK A2,...,WORK An → SECTION A

WORK B1, WORK B2,...,WORK Bn → SECTION B

WORK C1, WORK C2,...,WORK Cn → SECTION C

CAR MODEL X

SECTION A    WORK A1, WORK A2,...,WORK An

PARTS A1, PARTS A2,...,PARTS An

SECTION B

SECTION C

SELECT DAMAGE SECTION TO TURN THE COLUMN BLUE

| FROM PREVIOUS PAGE |
| FRONT FENDER |
| FENDER MARKER LAMP |
| FENDER MIRROR |
| DOOR MIRROR |
| MOLDING & STRIPE SIDE MOLDING |
| MOLDING & STRIPE STRIPE GT |
| EMBLEM & NAMEPLATE FRONT |
| EMBLEM & NAMEPLATE FRONT |
| EMBLEM & NAMEPLATE AND REAR |
| CONTINUE TO NEXT PAGE |

SELECT BY ↑↓, DETERMINE BY SPACE, PROCEED BY F1
OK → F1, PREVIOUS PAGE → F3, NEXT PAGE → F4,
RETURN TO SELECTION DAMAGE TYPE MENU → F8,
CANCEL/PRIMARY MENU → F10

Fig. 9

| SELECT REPAIR WORK ITEM | OPERA-TION TIME | NUMBER OF PLACE |
|---|---|---|
| FRONT FENDER ATTACH/DETACH (D) | 0.75 | |
| FRONT FENDER REPLACE (FENDER MIRROR TYPE)(X) | 1.10 | |
| FRONT FENDER REPLACE (DOOR MIRROR TYPE)(X) | 1.05 | |
| FRONT FENDER PROTECT MOLE ATTACH/DETACH OR REPLACE SINGLE UNIT WORK(D·X) | 0.15 | |
| FRONT FENDER LINER ATTACH/DETACH OR REPLACE SINGLE UNIT WORK(D·X) | 0.15 | |
| FRONT MUDGUARD PROTECTOR ATTACH/DETACH OR REPLACE SINGLE UNIT WORK(D·X) | 0.15 | |

SELECT BY ↑↓, DETERMINE BY SPACE, PROCEED BY FUNCTION KEY.
OK → F1, PREVIOUS PAGE → F3, NEXT PAGE → F4,
PREVIOUS SECTION → F8, DESCRIPTION MENU → F9,
CANCEL/PRIMARY MENU → F10

Fig. 10

SELECT PARTS TO BE REPAIRED AND PARTS TO BE FABRICATED    FRONT FENDER

| | FRONT FENDER | OPERA-TION TIME |
|---|---|---|
| 1. | FRONT FENDER PANEL | |
| (R) | 1800 XT SALOON·ULI EXTRA WITH MIRROR HOLE | 1 |
| (R) | 1800 XT SALOON·ULI EXTRA WITHOUT MIRROR HOLE | 1 |
| (R) | 1800 LT·XT·UC·LC WITH MIRROR HOLE | 1 |
| (R) | 1800 XT·UL WITHOUT MIRROR HOLE | 1 |
| (R) | OTHER MODEL WITH MIRROR HOLE | 1 |
| (R) | OTHER MODEL WITHOUT MIRROR HOLE | 1 |
| (L) | 1800 XT SALOON·ULI EXTRA WITH MIRROR HOLE | 1 |
| (L) | 1800 XT SALOON·ULI EXTRA WITHOUT MIRROR HOLE | 1 |
| CONTINUE TO NEXT PAGE | | |

SELECT BY ↑↓, DETERMINE BY SPACE, PROCEED BY FUNCTION KEY
OK → F1, PREVIOUS PAGE → F3, NEXT PAGE → F4,
PREVIOUS SECTION → F8, CANCEL → F10

Fig. 11

SELECT COATING WORK TO TURN THE COLUMN BLUE

| COATING SOLID ACRYLIC LACQUER |
| COATING SOLID RAPID CURE URETHANE |
| COATING SOLID ACRYLIC URETHANE |
| COATING METALLIC ACRYLIC LACQUER |
| COATING METALLIC RAPID CURE URETHANE |
| COATING METALLIC ACRYLIC LACQUER |
| COATING PEARL ACRYLIC LACQUER |
| COATING PEARL RAPID CURE URETHANE |
| COATING PEARL ACRYLIC URETHANE |

SELECT BY ↑↓, DETERMINE BY SPACE, PROCEED BY F1
OK → F1, PREVIOUS PAGE → F3, NEXT PAGE → F4,
CANCEL/PRIMARY MENU → F10

Fig.12

SELECT MAIN PANEL FOR DIRECTING COLOR MIXING AND COATING

| | OPERA-TION TIME | MATERIAL COST |
|---|---|---|
| 1. COLOR MIXING ... 1 COLOR | 1.20 | 0 |
| 2. COLOR MIXING ... 2 COLORS | 1.90 | 0 |
| 3. COLOR MIXING ... 3 COLORS | 2.60 | 0 |
| 101. HOOD | 3.00 | 1,770 |
| 102. FRONT FENDER | | |
| (R) 1 COLOR | 2.00 | 1,360 |
| (R) 2 COLORS | 2.30 | 1,200 |
| (R) 3 COLORS | 2.80 | 1,440 |
| (L) 1 COLOR | 2.00 | 1,360 |
| (L) 2 COLORS | 2.30 | 1,200 |
| CONTINUE TO NEXT PAGE | | |

SELECT BY ↑↓, DETERMINE BY SPACE, PROCEED BY FUNCTION KEY.
OK → F1, PREVIOUS PAGE → F3, NEXT PAGE → F4,
RETURN TO DESCRIPTION MENU → F9,
CANCEL/PRIMARY MENU → F10

Fig. 13

CONFIRM/CORRECT DESCRIPTION OF TECHNICAL REPAIR FEE
FRONT FENDER

| DETAIL OF REPAIR | RL | OPERA-TION TIME | TECHNICAL FEE |
|---|---|---|---|
| FRONT FENDER DETACHMENT/ATTACHMENT (D) | L | 0.75 | 3,900 |
| FRONT FENDER REPLACEMENT (DOOR MIRROR TYPE) (X) | R | 1.05 | 5,460 |
| FRONT FENDER SHEET PANEL (B) | L | 1.50 | 7,800 |
| GLASS CLEANING FEE | | 0.00 | 0 |
| | | | |
| | | | |
| | | | |
| | | | |
| | | | |
| | | | |
| LABOR RATE : 5,200 | TOTAL | 3.30 | ¥17,160 |

SELECT BY ↑↓ , PROCEED OR ADD/CORRECT/DELETE, BY FUNCTION KEY, OK → F1, PREVIOUS PAGE → F3, NEXT PAGE → F4, ADD → F5, CORRECT/DELETE → F6, RETURN TO WORK ITEM/PARTS SELECTION MENU → F7, ADD SECTION → F8, CANCEL/PRIMARY MENU → F10

Fig. 14

| CONFIRM/CORRECT DESCRIPTION OF PARTS PRICE AND PARTS NAME | | | | |
|---|---|---|---|---|
| NAME OF PARTS | PARTS NO. | UNIT PARTS PRICE | QUAN-TITY | PRICE |
| FRONT FENDER PANEL (R) | 53801-32130 | 20,700 | 1 | 20,700 |
| MINOR PARTS | | 0 | 0 | |
| OIL/LLC/COOLER GAS | | 0 | 0 | |
| UNDERCOAT/RUSTING PROOF CEILING MATERIAL | | 0 | | |
| GLASS ADHESIVE MATERIAL /COKING MATERIAL | | 0 | 0 | |
| | | | | |
| | | | | |
| | | | | |
| | | | | |
| TOTAL OF PARTS PRICES | | | | ¥20,700 |

PLEASE CARE ABOUT PARTS PRICE WITH "※" MARK BECAUSE PRICE IS DIFFERENT ACCORDING TO CAR MODEL.
SELECT BY ↑↓ , PROCEED OR ADD/CORRECT/DELETE BY FUNCTION KEY, OK → F1, PREVIOUS PAGE → F3, NEXT PAGE → F4, ADD → F5, CORRECT/DELETE → F6, RETURN TO PARTS SELECTION MENU → F7, ADD SECTION → F6, RETURN TO TECHNICAL DESCRIPTION → F9, CANCEL/PRIMARY MENU → F10

Fig. 15

CONFIRM/CORRECT DESCRIPTION OF COATING TECHNICAL FEE/MATERIAL COATS

COATING COLOR : SUPER WHITE
PAINT : ACRYL LACQUER

| | OPERA-TION TIME | MATERIAL COST |
|---|---|---|
| COLOR ADJUSTMENT | 1.20 | 20,700 |
| FRONT FENDER(R) | 2.00 | 0 |
| FRONT FENDER(L) | 2.00 | 0 |
| PLURAL PANELS DISCOUNT | 0.60 | 0 |
| METAL TREATMENT BELOW 2dm² (15cm SQUARE) 1 PLACE | 0.40 | 0 |
| RUSTING PROOF | 0.00 | — |
| | 500 | 2,820 |
| TOTAL OF TECHNICAL FEE | | ¥26,000 |
| TOTAL OF COATING FEE | | ¥28,820 |

LABOUR RATE : 5,200
OPERATION TIME TOTAL OF MATERIAL COSTS

SELECT BY ↑↓, PROCEED OR ADD/CORRECT/DELETE, BY FUNCTION KEY, OK → F1, PLURAL PARTS DISCOUNT → F2, PREVIOUS PAGE → F3, NEXT PAGE → F4, ADD → F5, CORRECT/DELETE → F6, RETURN TO SELECTION MENU → F7, RESELECT → F8, RETURN TO DESCRIPTION OF PARTS PRICE → F9, CANCEL/PRIMARY MENU → F10

Fig. 16

| Fig. 17 |
| Fig. 18 |

Fig. 19

| Fig. 20 |
| Fig. 21 |

Fig. 22

| Fig. 23 |
| Fig. 24 |

Fig. 17

ESTIMATE OF REPAIRS

PAGE: _____
DATE OF ISSUE : _____
Messers. _____

FROM : _____

ADDRESS _____

TELEPHONE NO. _____

BANKERS: _____ BRANCH: _____
ACCOUT NO. _____

| DATE OF DEPOSIT | DATE OF DELIVERY | REGISTRATION NO. | CAR FRAME NO. | TYPE -GROUP NO. | FIRST REGISTRATION | MILEAGE DISTANCE |
|---|---|---|---|---|---|---|
| April 26 | May 2 | Osaka 59 4521 | AE91-AEPEUS-00012343 | 44213-896 | October 1987 | 019571Km |

| MAKER | MODEL | TYPE | DISPLACEMENT | GRADE | ENGINE TYPE | TRANSMISSION | BODY COLOR |
|---|---|---|---|---|---|---|---|
| | 4 DOOR | E-AE91 AEPEUS | 1500 cc | 1500SE LIMITED | 5AF | Automatic | Gray Metallic |

| WITNESS INSURANCE COMPANY | NAME OF ADJUSTER | WITNESS DATE | REMARKS/ORDER NO. |
|---|---|---|---|
| | Murata | April 26, 1989 | Rental car during repair work 2415 |

| ESTIMATOR | INSPECTING ENGINEER | REPAIRER | COATING ENGINEER |
|---|---|---|---|
| G.Stervens | | S. King | D. Jonson |

Fig.18

| DESCRIPTION AND FEE | |
|---|---|
| REPAIR TECHNICAL FEE | 26,675 |
| PARTS PRICE | 93,380 |
| COATING TECHINICAL FEE | 41,030 |
| COATING MATERIAL COST | 6,180 |
| PHOTOGRAPH PRICE | 1,000 |
| SUBTOTAL | 168,265 |
| DISCOUNT | ▷ 265 |
| CONSUMPTION TAX | 5,040 |
| TOTAL | 176,040 |

| OTHER CHARGE | |
|---|---|
| COMMISION | |
| 1. AUTOMOBILE INSPECTION REPRESENTATIVE FEE | 120,000 |
| GRAGE CERTIFICATION FEE | 10,000 |
| CONSUMPTION TAX | 660 |
| TAX, INSURANCE | |
| 1. SPECIFIED TAX | 36,450 |
| 2. COMPULSORY AUTOMOBILE LIABILITY INSURANCE | 42,000 |
| 3. REVENUE STAMP FEE | 12,000 |
| TOTAL | 102,310 |

| | TOTALS OTHER CHARGE | PROPERTY DAMAGE INSURANCE | PHYSICAL DAMAGE INSURANCE | DEDUCTIBLE | PAYMENT IN ADVANCE | BALANCE DUE |
|---|---|---|---|---|---|---|
| TOTALS | 102,310 | 170,000 | 95,350 | 10,000 | 10,000 | |
| 173,040 | | | | | | |

Fig. 20

PAGE: _____
DATE OF ISSUE : _____

LABOR RATE: ¥5,500/h

| DESCRIPTION OF REPAIR TECHNICAL FEE/PARTS PRICE<br>ITEM | UNIT COST | PIECE | PRICE | OPERA-TION TIME | TECHNICAL FEE |
|---|---|---|---|---|---|
| SECTION: FRONT BUMPER | | | | | |
| FRONT BUMPER REPLACE WITH SPOILER [X] | | | | 0.85 | 4,675 |
| FRONT BUMPER COVER | 29,000 | 1 | 29,000 | | |
| FRONT BUMPER MOLDING | 2,750 | 1 | 2,750 | | |
| FRONT CENTER SPOILER | 5,100 | 1 | 5,100 | | |
| FRONT SPOILER (R) | 7,200 | 1 | 7,200 | | |
| SECTION: RADIATOR GRILL | | | | | |
| RADIATOR GRILL REPLACE [X] | | | | 0.15 | 825 |
| RADIATOR GRILL | 6,500 | 1 | 6,500 | | |
| SECTION: HOOD | | | | | |
| HOOD REPLACE WITH INSULATOR [X] | | | | 0.55 | 3,025 |
| HOOD | 19,800 | 1 | 19,800 | | |
| HOOD INSULATOR | 3,370 | 1 | 3,370 | | |
| SECTION: FRONT FENDER | | | | | |
| FRONT FENDER ATTACH/DETACH [DJ(L) | | | | 0.50 | 2,750 |
| FRONT FENDER REPLACE (DOOR MIRROR TYPE)[X](R) | | | | 0.80 | 4,400 |
| FRONT FENDER SHEET METAL [B](L) | | | | 2.00 | 11,000 |
| FRONT FENDER (R) | 16,500 | 1 | 16,500 | | |
| FRONT FENDER LINER (R) | 3,160 | 1 | 3,160 | | |
| TOTAL | | | 93,380 | 4.85 | 26,675 |

Fig. 21

| COATING TECHNICAL FEE/MATERIAL PRICE | | | LABOR RATE: ¥5,500/h | |
|---|---|---|---|---|
| ITEM | | MATERIAL PRICE | COATING OPERA-TION TIME | TECHNICAL FEE |
| COLOR MIXING...1 COLOR | | | 2.70 | 14,850 |
| HOOD | | 2,660 | 2.45 | 13,475 |
| FRONT FENDER (R) | | 1,760 | 1.75 | 9,625 |
| FRONT FENDER (L) | | 1,760 | 1.75 | 9,625 |
| DISCOUNT BECAUSE OF PLURAL PANELS | | | -1.19 | -6,545 |
| TOTAL | | 6,180 | 7.46 | 41,030 |

※ TOTAL OF TECHNICAL FEE EQUALS TO THE VALUES OF MULTIPLYING TOTAL OF OPERATION TIME BY LABOR RATE BECAUSE OF ABOVE PRICE ARE NOT GUARANTEED.

Fig. 23

DELIVERY NOTE

PAGE: _____
DATE OF ISSUE: _____
Messers. _____

ADDRESS _____

TELEPHONE NO. _____

FROM: _____

BANKERS: _____  BRANCH: _____
ACCOUT NO. _____

| DATE OF DEPOSIT | DATE OF DELIVERY | REGISTRATION NO. | CAR FRAME NO. | TYPE -GROUP NO. | FIRST REGISTRATION | MILEAGE DISTANCE |
|---|---|---|---|---|---|---|
| April 26 | May 2 | Osaka 59 4521 | AE91-AEPEUS-00012343 | 44213-896 | October 1987 | 019571Km |
| MAKER | MODEL | TYPE | DISPLACEMENT | GRADE | ENGINE TYPE | TRANSMISSION | BODY COLOR |
| | 4 DOOR | E-AE91 AEPEUS | 1500 cc | 1500SE LIMITED | 5AF | Automatic | Gray Metallic |

| WITNESS INSURANCE COMPANY | NAME OF ADJUSTER | WITNESS DATE | REMARKS/ORDER NO. |
|---|---|---|---|
| | Murata | April 26, 1989 | Rental car during repair work 2415 |

| ESTIMATOR | INSPECTING ENGINEER | REPAIRER | COATING ENGINEER | | |
|---|---|---|---|---|---|
| G.Stervens | | S. King | D. Jonson | | |

Fig. 24

| DESCRIPTION AND FEE | |
|---|---|
| REPAIR TECHNICAL FEE | 26,675 |
| PARTS PRICE | 93,380 |
| COATING TECHINICAL FEE | 41,030 |
| COATING MATERIAL COST | 6,180 |
| PHOTOGRAPH PRICE | 1,000 |
| SUBTOTAL | 168,265 |
| DISCOUNT | 265 |
| CONSUMPTION TAX | 5,040 |
| TOTAL | 176,040 |

| OTHER CHARGE | |
|---|---|
| COMMISION | |
| 1. AUTOMOBILE INSPECTION REPRESENTATIVE FEE | 120,000 |
| GRAGE CERTIFICATION FEE | 10,000 |
| CONSUMPTION TAX | 660 |
| TAX, INSURANCE | |
| 1. SPECIFIED TAX | 36,450 |
| 2. COMPULSORY AUTOMOBILE LIABILITY INSURANCE | 42,000 |
| 3. REVENUE STAMP FEE | 12,000 |
| TOTAL | 102,310 |

| | TOTALS OTHER CHARGE | PROPERTY DAMAGE INSURANCE | PHYSICAL DAMAGE INSURANCE | DEDUCTIBLE | PAYMENT IN ADVANCE | BALANCE DUE |
|---|---|---|---|---|---|---|
| | 102,310 | 170,000 | 95,350 | 10,000 | 10,000 | |
| TOTALS | | | | | | |
| 173,040 | | | | | | |

Fig. 25

CONFIRM/CORRECT DESCRIPTION OF TECHNICAL REPAIR FEE
FRONT FENDER

| DETAIL OF REPAIR | RL | OPERA-TION TIME | TECHNICAL FEE |
|---|---|---|---|
| FRONT FENDER DETACHMENT/ATTACHMENT (D) | L | 0.75 | 3,900 |
| FRONT FENDER REPLACEMENT (DOOR MIRROR TYPE) (X) | R | 1.05 | 5,460 |
| FRONT FENDER SHEET PANEL (B) | L | 1.50 | 7,800 |
| GLASS CLEANING FEE | | 0.00 | 0 |
| | | | |
| | | | |
| | | | |
| | | | |
| | TOTAL | 3.30 | ¥17,160 |

LABOR RATE : 5,200

SELECT BY ↑↓ , PROCEED OR ADD/CORRECT/DELETE, BY FUNCTION KEY, OK → F1, PREVIOUS PAGE → F3, NEXT PAGE → F4, ADD → F5, CORRECT/DELETE → F6, RETURN TO WORK ITEM/PARTS SELECTION MENU → F7, ADD SECTION → F8, CANCEL/PRIMARY MENU → F10

Fig. 26

| CONFIRM/CORRECT DESCRIPTION OF PARTS PRICE AND PARTS NAME | | | | |
|---|---|---|---|---|
| NAME OF PARTS | PARTS NO. | UNIT PARTS PRICE | QUAN -TITY | PRICE |
| FRONT FENDER PANEL (R) | 53801-32130 | 20,700 | 1 | 20,700 |
| MINOR PARTS | | 0 | 0 | |
| OIL/LLC/COOLER GAS | | 0 | 0 | |
| UNDERCOAT/RUSTING PROOF CEILING MATERIAL | | 0 | | |
| GLASS ADHESIVE MATERIAL /COKING MATERIAL | | | 0 | |
| | | | | |
| | | | | |
| TOTAL OF PARTS PRICES | | | | ¥20,700 |

PLEASE CARE ABOUT PARTS PRICE WITH "※" MARK BECAUSE PRICE IS DIFFERENT ACCORDING TO CAR MODEL.
SELECT BY ↑↓ , PROCEED OR ADD/CORRECT/DELETE BY FUNCTION KEY, OK → F1, PREVIOUS PAGE → F3, NEXT PAGE → F4, ADD → F5, CORRECT/DELETE → F6, RETURN TO PARTS SELECTION MENU → F7, ADD SECTION → F6, RETURN TO TECHNICAL DESCRIPTION → F9, CANCEL/PRIMARY MENU → F10

Fig. 27

CONFIRM/CORRECT DESCRIPTION OF COATING TECHNICAL FEE/MATERIAL COSTS

COATING COLOR : SUPER WHITE
PAINT : ACRYL LACQUER

| | OPERATION TIME | MATERIAL COST |
|---|---|---|
| COLOR ADJUSTMENT | 1.20 | 20,700 |
| FRONT FENDER(R) | 2.00 | 0 |
| FRONT FENDER(L) | 2.00 | 0 |
| PLURAL PANELS DISCOUNT | 0.60 | 0 |
| METAL TREATMENT BELOW 2dm (15cm SQUARE) 1 PLACE | 0.40 | 0 |
| RUSTING PROOF | 0.00 | |

LABOUR RATE : 5,200
OPERATION TIME TOTAL OF MATERIAL COSTS   500   2,820
TOTAL OF TECHNICAL FEE   ¥26,000
TOTAL OF COATING FEE   ¥28,820

SELECT BY ↑↓ , PROCEED OR ADD/CORRECT/DELETE, BY FUNCTION KEY, OK → F1, PLURAL PARTS DISCOUNT → F2, PREVIOUS PAGE → F3, NEXT PAGE → F4, ADD → F5, CORRECT/DELETE → F6, RETURN TO SELECTION MENU → F7, RESELECT → F8, RETURN TO DESCRIPTION OF PARTS PRICE → F9, CANCEL/PRIMARY MENU → F10

Fig. 30

|  |  |  |
|---|---|---|
| (R) 1800 XT·VL WITH MIRROR HOLE | 53801-32130 | 20,700 |
| (R) OTHER GARDE WITH MIRROR HOLE | 53801-32110 | 20,700 |
| (R) OTHER GARDE WITHOUT MIRROR HOLE | 53801-32120 | 20,700 |
| (L) 1800 XT SALOON·VL EXTRA WITH MIRROR HOLE | 53802-32110 | 20,700 |
| (L) 1800 XT SALOON·VL EXTRA WITHOUT MIRROR HOLE | 53802-32120 | 20,700 |
| (L) 1800 LT·XT·VC·VL WITH MIRROR HOLE | 53802-32090 | 20,700 |
| (L) 1800 XT·VL WITHOUT MIRROR HOLE | 53802-32100 | 20,700 |
| (L) OTHER GARDE WITH MIRROR HOLE | 53802-32110 | 20,700 |
| (L) OTHER GARDE WITHOUT MIRROR HOLE | 53802-32120 | 20,700 |
| 2. FENDER PANEL SUPPORT | 53899-32010 | 250 |
| 3. FENDER TO EXTENSION PLACE | 53835-32020 | 390 |
| 4. FENDER SEAL | 53882-32020 | 390 |
| 5. FENDER TO COWL SIDE SEAL |  |  |
| (R) | 53866-32020 | 490 |
| (L) | 53867-32020 | 490 |
| 6. FENDER TO HOOD BUMPER | 53384-14030 | 120 |
| 7. BUMPER RETAINER |  |  |
| (R) | 53385-14010 | 90 |
| (L) | 53386-14010 | 90 |

Fig. 31

INPUT CODE NUMBER IN 'ESTIMATING GUIDEBOOK'.  JULY 2, 1988

| SECTION | 200 | FRONT FENDER | | |
|---|---|---|---|---|
| CODE | WORK ITEMS OR PARTS | | | |
| 50 | R | | 0.75 | |
| 52 | L | | 1.05 | |
| 1 | (R) 53801-32130 | | 1 | |
| 1 | (L) | | 1.50 | |

INPUT BY TEN KEY, DETERMINE BY RETURN KEY, PROCEED BY FUNCTION KEY OK→F1, PREVIOUS PAGE→F3, NEXT PAGE→F4, DELETE→F6, SELECT COATING WORK→F9, CANCEL/PRIMARY MENU→F10

APPARATUS FOR CALCULATING A REPAIR COST OF A DAMAGED CAR

BACKGROUND OF THE INVENTION

1. Field of the invention

Present invention relates to an apparatus for calculating the repair cost of a car that has been damaged in an accident and more particularly, to such an apparatus which enables calculation of repair cost and formation of, for example an estimate and sales slip to be easily carried out.

2. Description of the related art

In repairing a damaged car, an accurate estimate is first required. It takes many hours to estimate repair work costs including technician fees and the price of replacement parts. Indeed, the estimate of repair cost is conventionally carried out by an expert.

The conventional methods of estimating a repair cost suffer the following drawbacks.

(1) Generally, it takes 30 minutes to estimate a repair cost equivalent to 100,000 yen. Further when a repair cost of several hundred thousand yen is estimated, many items and parts are often overlooked (so called estimate omission). Therefore, it is said that an accurate estimate is almost impossible.

(2) Even if an estimating manual is used, containing information regarding work items, parts and so on, it is very difficult to retrieve and pick up several tens or sometimes over a hundred different work items and parts, and estimate omission often occurs.

(3) Estimators under a heavy work burden, when faced with a greatly damaged car are usually forced to work overtime hours or night hours to carry out the estimate.

(4) There is a shortage of expert estimators available for hire.

(5) In the case where estimates are not accurate, stable management can not be expected.

SUMMARY OF THE INVENTION

The object of the invention is to provide an apparatus for calculating a repair cost of a damaged car, which enables a worker to estimate a repair cost of a damaged car conveniently and accurately.

An apparatus for calculating a repair cost of a damaged car comprises a recording medium for storing information of a damage type, a section, a repair work item and a part which are included in the section and a value of a repair cost corresponding to the repair work item and the part; first means for reading out information stored in the recording medium and for displaying the information on a screen and for selecting the damage type, the section which should be repaired and the repair work item and the part; second means for calculating the repair cost from the value corresponding to the repair work item and part selected by the first means.

The apparatus comprises the recording medium being a Read Only Memory realized by, for example a Compact Disk.

The apparatus further comprises the recording medium for storing information of the parts, the code numbers attached to the parts as screen images, the code numbers of the parts and the parts names corresponding to the code numbers as a table, the first means for displaying the screen images and a table on a screen and for selecting the parts to be repaired and for inputting the parts.

The apparatus comprises the first display means displays an operation procedure on the screen.

The apparatus comprises a sheet on which drawings of a plurality of parts, code numbers of sections to which the parts belong, repair work items, code numbers of the repair work items, parts names and the code numbers of the parts are described and the first means for selecting the code numbers described on the sheet and for inputting the code numbers.

The apparatus further comprises the recording medium for storing a plurality of combinations of a kind of coating color and a kind of coating material, a coating work item in the combination and a value of a repair cost corresponding to the coating work item, the first means for reading out the information stored in the recording medium and for displaying the information on the screen and for selecting the combination, and the coating work item and the second means for calculating the repair cost from the value corresponding to the combination and the coating work item.

According to the invention, information of (a) the damage type, (b) the repair work item and the part included in the section to be repaired, and (c) the value of the repair cost, for example a work operation time or a price are stored in the recording medium.

When the repair cost is estimated, for example in a repair workhouse, the information stored in the recording medium is read out by the first means at first and then the information are displayed on, for example a cathode ray tube. Thereafter, the damage type is selected, further the work item and part in the section to be repaired are selected.

Thereafter, the repair cost is obtained from the value of the work item and the part in the section which is selected by the second means. For example, when the value is a work operation time, repair cost is obtained as the results of multiplying a cost per a work operation time by a total of work operation times. When the value is a price, a repair cost is obtained from a total of prices. Thus, a repair cost is estimated with convenience, accuracy and without an error.

It is desirable that the recording medium is a Read Only Memory embodied by a Compact Disk (abbreviated as CD-ROM), whereby a large quantity of information are stored.

According to the invention, the part and the code number attached to the part are stored in the recording medium as a screen image. Further, the code number of the part and the part name corresponding to the code number are stored in the form of a table in the recording medium. Necessary parts for a repair work are selected and inputted very easily and without an error because the information as mentioned above are displayed on a screen.

Further, according to the invention, by displaying an operation procedure on the screen, an operation is proceeded with convenience and without referring to an operation manual. Such an easy operation is important in order to improve an efficiency in an office, especially in a repair workhouse.

In the invention, a sheet such as a booklet may be provided, wherein drawings of plural parts, code numbers of sections to which the parts belong, repair work items, code numbers of repair work items, parts names and code numbers of parts are described. By selecting the code numbers described on the sheet and inputting them, a total of a repair cost is obtained.

Further, according to the invention, the recording medium stores the information of (a) a plurality of combinations of a kind of coating color and a kind of coating material, (b) coating work items included in the combinations, and (c) a value of repair cost corresponding to the coating work items.

By displaying the information stored in the recording medium and selecting the combinations and the coating work items which are necessary for a repair work, a total of repair costs is obtained.

As above mentioned, according to the invention, a repair cost of a damage car is able to be estimated easily, with convenience and accuracy and without estimate omission.

BRIEF DESCRIPTION OF THE DRAWINGS

Other and further objects, features and advantages of the invention will become clear from the following detailed description taken with reference to the drawings wherein:

FIG. 4 is a drawing for explaining a concept of a section, FIG. 5 is a drawing for explaining additionally a concept of a section, FIG. 8 is a drawing showing a display screen for selecting a section, FIG. 9 is a drawing showing a display screen for selecting a repair work item, FIG. 10 is a drawing showing a display screen for selecting a part, FIG. 11 is a drawing showing a display screen for selecting a coating color and a coating material, FIG. 12 is a drawing showing a display screen for selecting a coating work item, FIG. 13 is a drawing showing a screen for confirming a description of a repair technician fee, FIG. 14 is a drawing showing a display screen for confirming a description of a part price, FIG. 15 is a drawing showing a display screen for confirming a description of a coating technical fee and a material cost, FIGS. 16-21 are drawings showing an example of a written estimate printed by a printing means 5, FIGS. 22-24 are drawings showing an example of a delivery note printed by the printing means 5, FIG. 25 is a drawing showing a display screen for correcting a description of a repair technician fee, FIG. 26 is a drawing showing a display screen for correcting a description of a part price, FIG. 27 is a drawing showing a display screen for correcting a description of a coating technician fee and a material cost, FIGS. 28-30 are drawings showing an example of a sheet, and FIG. 31 is a drawing showing a display screen for inputting using the sheet.

DETAILED DESCRIPTION OF THE PREFERRED EMBODIMENTS

Figure 1:
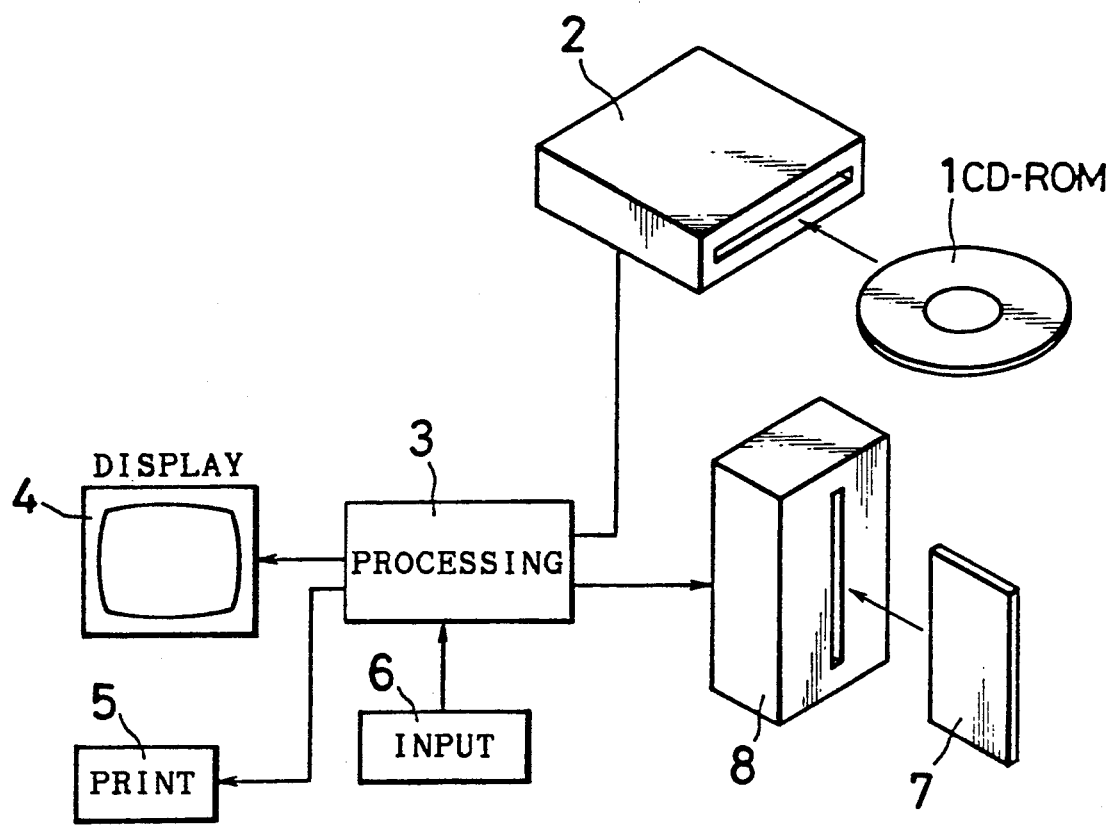
FIG. 1 is a overall diagram of an embodiment in the present invention.

Now referring to the drawings, preferred embodiments of the invention are described below.

FIG. 1 is a block diagram representing an embodiment of the invention. The recording medium 1 which is a Read Only Memory realized by, for example, a Compact Disk (abbreviated as CD-ROM) is an important element of the configuration. The information stored in the medium is read by a reading means 2, and the information thus read is transferred to a processing circuit 3 realized by, for example, a personal computer, and processed. Thereafter, the results of processing are displayed by a display means 4 realized by, for example, a cathode ray tube, and then, for example, a written estimate and a sales slip are printed out by a printing means 5.

An input means 6 which is realized by, for example, a key board is connected to the processing circuit 3. Further, a rewritable recording medium 7, for example, a floppy disk is provided for accounting processing. The recording medium 7, which is mounted on a reading/writing means 8, is controlled by the processing circuit 3.

Figure 2:
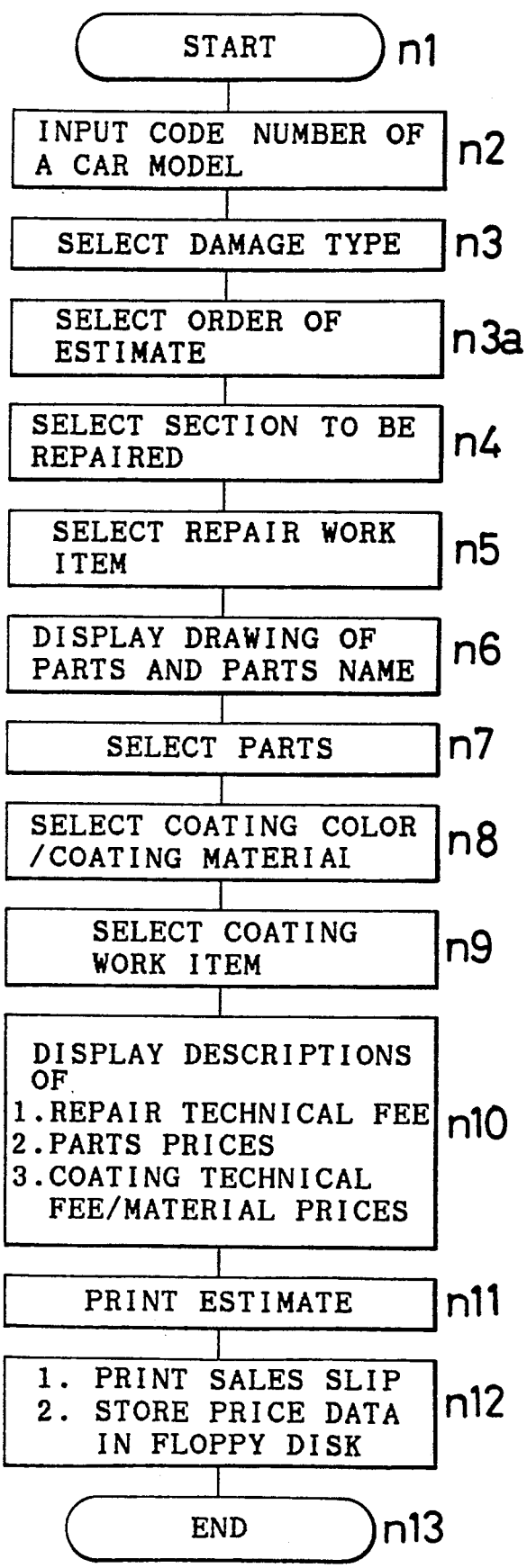
FIG. 2 is a flow chart explaining an operation of a processing circuit 3 as shown in FIG. 1.

FIG. 2 is a flow chart for explaining an operation of the processing circuit 3.

In the processing circuit 3, a repair cost calculation is carried out automatically and conveniently responsive to operations of the input means 6 on basis of the information stored in the recording medium 1.

Figure 3:
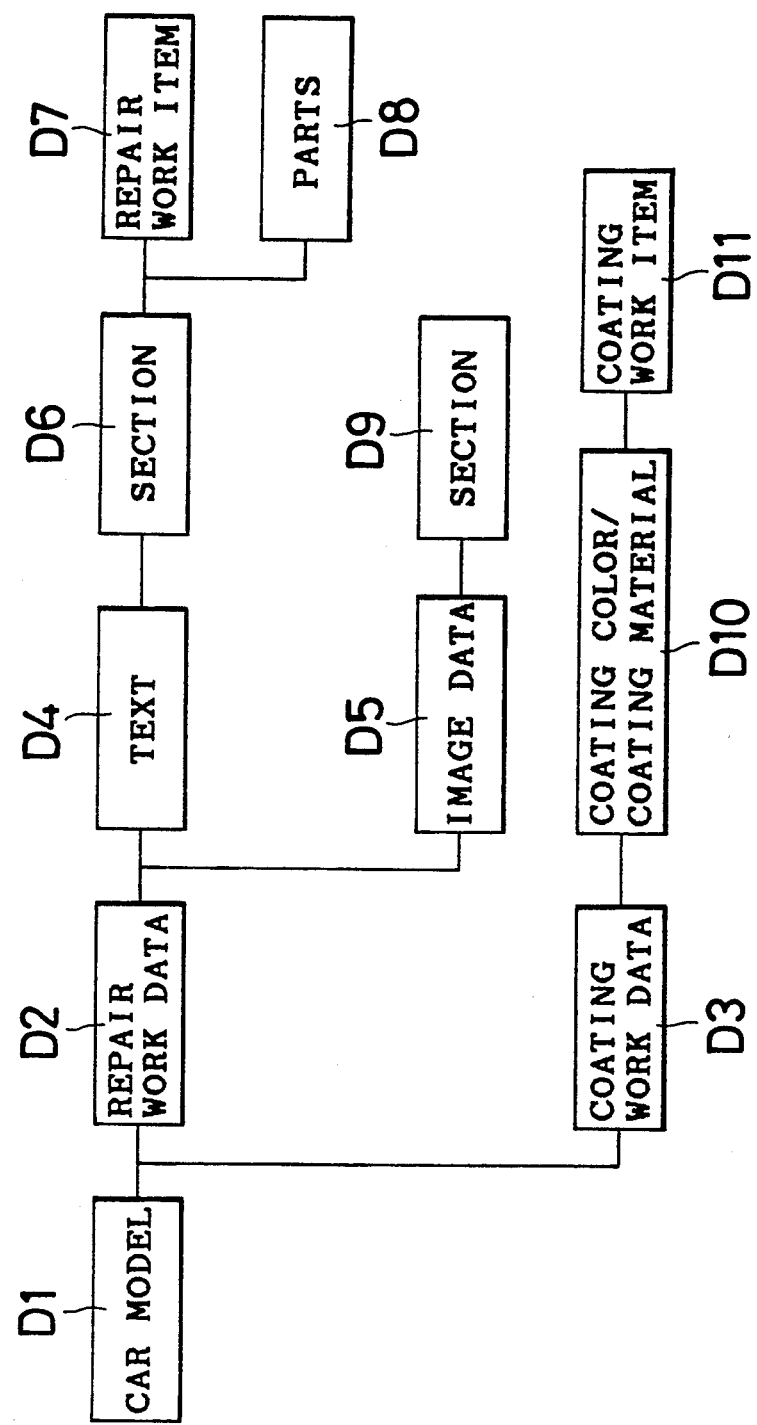
FIG. 3 is a drawing showing a structure of data recorded in a recording medium 1.

FIG. 3 is a drawing showing a structure of stored data in the recording medium 1. In the recording medium 1, repair work data D2 and coating work data D3 are stored for every car model D1. The repair work data D2 includes a text D4 which is in the form of a table and an image data D5. In the text D4, 'section' D6 which is an original concept in the invention is included. The section D6 includes data of repair work items D7 and data of parts D8.

In the image data D5, data of section D9 is included. In the coating work data D3, coating data D10 which is a combination of a kind of coating color and a kind of coating material and a coating work item D11 are included. Thus, (1) regarding repair work items and parts, classification is realized by a concept of a section, (2) regarding coating work items, classification is also realized by the similar concept with the section; a coating color system and a coating material system.

By attaching a code number to the car model, section, the repair work item, the part, the combination of the coating color system and the coating material system, an easy selection operation is realized.

The details of the concept of a section which is adopted in the invention, are explained below. The apparatus enables a worker who experiences a repair work of a car body or has a basic knowledge regarding a repair work to calculate a repair cost rapidly and accurately.

The section is a relational concept, where a specified part of a car body appears as the section responsive to an action of a repair work. For example, a section of a front bumper is not recognized as a gatherings of parts; a bumper face, a bumper mall, a bumper stay, but as a relational concept which is imagined at carrying out or thinking about a work of replacing a front bumper.

The necessary sections A, B, C for repair work are correspondent to repair work items, A1-An, B1-Bn, C1-Cn as shown in FIG. 4.

In the invention, the concept of a section is utilized positively as a class, that is, an intermediate item between a car model and a work item, and between a car model and a part.

A relational concept of a section is utilized as a kind of classification concept for consolidating data of the work items and the parts at every car model, further utilized for configuration of a screen display by the display means 4 and a operation method of the input means 6. When the sections A, B, C are included in a car model X as shown in FIG. 5, regarding one of the sections, for example A, the repair work items A1-An and the parts A1-An corresponding to each of the work items are classified and systematized.

Thus, at retrieving and processing a large quantity of accurate data stored in the recording medium 1, the invention enables an easy and smooth operation for the estimator, and the invention presents the screen display and the operation method which is based on the selection of data of the repair work items and the parts at every sections.

An example of sections is described in Table 1.

TABLE 1

| | |
|---|---|
| 01# | FRONT BUMPER |
| 02# | HEADLAMP WASHER |
| 03# | FRONT TURN SIGNAL LAMP |
| 04# | FOG LAMPS |
| 07# | RADIATOR GRILL |
| 08# | HEADLAMP |
| 09# | HEADLAMP WIPER |
| 10# | HEADLAMP RADIATOR |
| 11# | SIDE LAMP (INSIDE OF A HEADLAMP) |
| 12# | SIDE LAMP (UNDER A HEADLAMP) |
| 13# | SIDE LAMP (OUTSIDE OF A HEADLAMP) |
| 15# | FOG LAMP |
| 17# | FRONT MASK PANEL |
| 18# | FRONT BALANCE PANEL |
| 19# | FOOD AND COWL TOP |
| 20# | FRONT FENDER |
| 21# | SIDE TURN SIGNAL LAMP |
| 22# | FENDER MARKER/HEADLAMP MONITOR |
| 23# | FENDER MIRROR |
| 25# | RADIATOR SUPPORT |
| 26# | FENDER APRON AND SIDE MEMBER |
| 27# | FRONT WINDSHIELD |
| 28# | FRONT WINDSHIELD WIPER |
| 35# | ROOM MIRROR |
| 36# | INSTRUMENT PANEL |
| 37# | FRONT DOOR |
| 38# | DOOR MIRROR |
| 39# | REAR DOOR |
| 40#.41# | MOLDING AND STRIPE |
| 42# | SIDE BODY |
| 43# | FUEL FILLER LID |
| 45# | ROOF |
| 46# | SEAT |
| 47# | QUARTER WINDSHIELD |
| 48# | BACK DOOR |
| 49# | REAR WINDSHIELD |
| 50# | REAR WINDSHIELD WIPER |
| 52# | TRUNK LID |
| 53# | REAR END AND PANEL AND FLOOR |
| 58# | REAR MOLDING |
| 59# | REAR COMBINATION LAMP |
| 60# | BUCK UP LAMP |
| 61# | REAR LICENSE PLATE LAMP |
| 62# | BACK SONAR |
| 63# | REAR BUMPER |
| 65#.66# | EMBLEM AND NAME PLATE |
| 71# | [WIRING IN ENGINE ROOM AND PIPE LAYING ACCESSORIES |
| 72#.73# | RADIATOR |
| 74#.75# | ENGINE |
| 76# | OIL COOLER |

TABLE 1-continued

| | |
|---|---|
| 77# | INTER COOLER |
| 78# | COOLER |
| 79# | HORN |
| 80# | FUEL TANK |
| 81# | MUFFLER |
| 82# | STEERING COLUMN |
| 83# | STEERING GEAR AND LINKAGE |
| 85# | FRONT SUSPENSION |
| 86# | REAR SUSPENSION |
| 87# | WHEEL |
| 88# | [WHEEL ALIGNMENT MEASUREMENT] |

Figure 6:
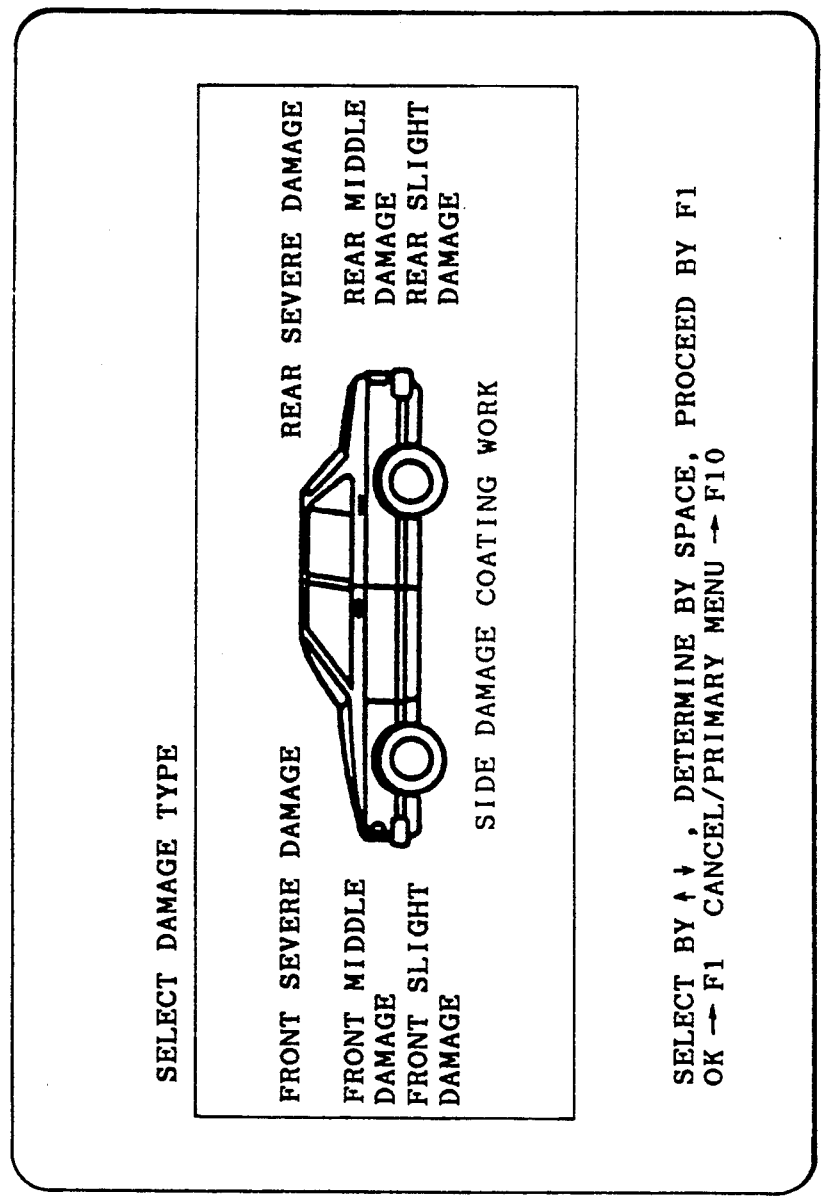
FIG. 6 is a drawing showing a display screen for selecting a damage type.

Referring to FIG. 2 again, the operation proceeds to step n2 from step n1, and a code number of a damaged car to be repaired is inputted. By this operation, a selection menu of a damage type corresponding to the code number is read out from the recording medium 7 and displayed by the display means 4 as shown in FIG. 6.

The damage type is selected while looking at a screen. For example, the damage type of a severe, middle or slight damage in a front part of a car body are selected at first, then the damage type of a severe, middle or slight damage in a rear part of a car body are selected, further the damage of side parts of a car body are selected while looking at a screen, and at the same time a selection regarding coating is carried out.

Figure 7:
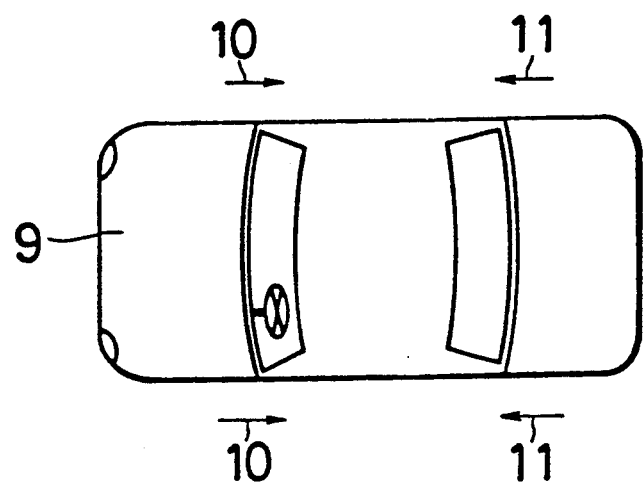
FIG. 7 is a plain view of a car body 9 for selecting an order of estimate.

At step n3a, an order of estimate is selected. The order of estimate is selected in a fixed order, for example according to the direction as indicated by an arrow mark 10; from a front part of a car body 9, or according to the direction as indicated by an arrow mark 11; from a rear part of a car body 9 as shown in FIG. 7, thereby estimate omission is prevented. At the next menu for selecting a section, the sections are displayed according to the selected order in which the sections are selected.

At step n4, the menu for selecting a section is displayed as shown in FIG. 8. A table of the sections in the selected damage type is displayed as shown in FIG. 8 after selecting the damage types and inputting them by the input means 6. From the table of the sections, the section to be estimated is selected. For example, the sections to be repaired, corresponding to middle damage in the front part of a car body are selected as above mentioned. Looking at the screen, an estimator selects the section by a cursor which is operated by the input means 6.

Thus, only a necessary data of a section for a repair work is retrieved after a damage type is selected at first and then a section is selected. According to such a double selection, a burden of the estimator is noticeably reduced. Further, the work items and the parts data of the section are selected. At first, at step n5, an operator selects a work item while looking at the screen as shown in FIG. 9. For example, a work to attach and detach a front fender is to detach the front fender from a car body and attach it to the place where it was. An operation time which is corresponded to a repair cost is attached to every work item. By multiplying the operation time by a labor rate which is a predetermined value, the repair cost is easily obtained. In the processing circuit 3, a price corresponding to an operation time is previously determined.

After selecting the work item at every section, a screen for selecting parts at step n6 is displayed as shown in FIG. 10. An illustration of a part 12 and a table of the parts 20 are displayed on a screen for selecting parts as shown in FIG. 10. In the table 20, the parts and the code numbers attached to the parts are also listed in the form of a table.

In the illustration 12, the parts and the code numbers attached to the parts are described. The selection of the parts is carried out by the input means 6 with reference to the part name and the code number. Thereby, the part which is difficult to be specified by only the part name is able to be selected accurately. An accurate estimate is possible by recognizing a configuration of the part and the structure of a car body in this way. Such a configuration as displaying both of the drawings and the parts data on the same screen in an important advantage in the invention. Further, data of the part is used as a repair work item, that is, by using a part name which is a portion of the part data, selection regarding fabrication work of a panel, so called sheet metal fabrication is possible. Regarding these parts and the works, the operation times on the basis of the repair cost are predetermined.

At step n8, a coating color and a coating material is selected. At this time the content of the recording medium 1 is displayed as shown in FIG. 11 by the display means 4. There are plural combinations of a kind of coating color and a kind of coating material. The kind of coating color and the kind of coating material of the damaged car to be repaired are inputted by input means 6.

At step n9, a coating work item is selected after a screen as shown in FIG. 12 is displayed by the display means 4. The operation times on the basis of the repair cost and the material costs are attached to the coating work items.

Thus, in the invention, regarding a coating work; a coating color system/a coating material system is substitute for the section. At first, a coating color system and a coating material system are selected on a selection menu of the coating color system/the coating material system as shown in FIG. 11. Then, the working item is selected on the selection menu of the coating work item as shown in FIG. 12. Thereby estimate of a coating work cost is easily obtained with a high accuracy.

At step n10, a description of repair technician fee is displayed in the form of table as shown in FIG. 13, the total of the operation times and the costs corresponding to the total of operation times are displayed.

Further, a description of parts price is displayed in the form of table as shown in FIG. 14, so that the estimator is able to confirm the content of the description.

A description of coating technician fee and material price is also displayed in the form of table as shown in FIG. 15, so that the estimator is also able to confirm the content of the description.

Figures 16, 17, 18, 19, 20, 21, 22, 23, 24:
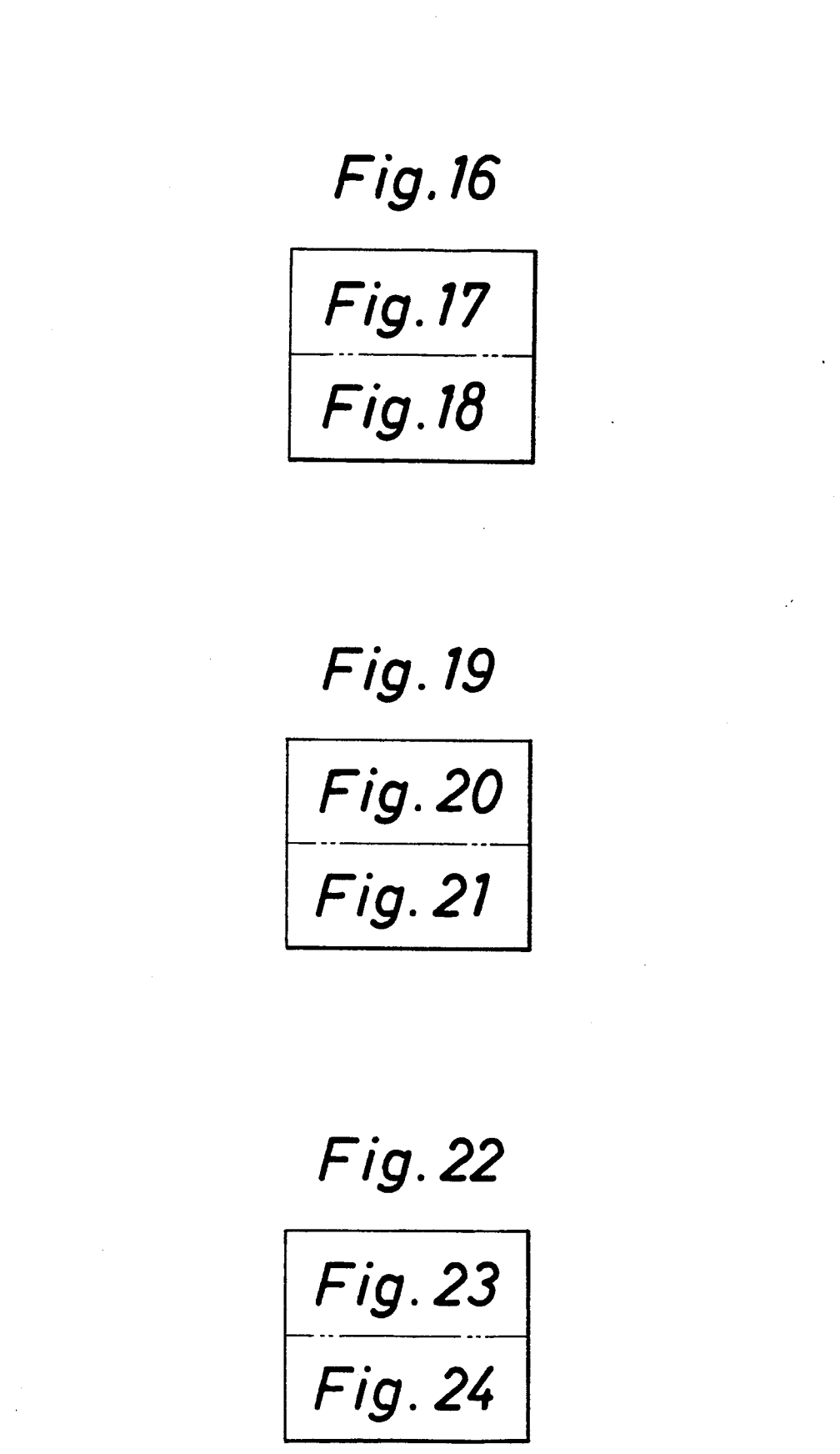

After the confirmation of the description, at step n11, for example a written estimate as shown in FIGS. 17-24 is made out. FIGS. 17-18 is a drawing showing an example of an estimate. FIGS. 20-21 is a drawing showing an example of a description of the repair technician fee/the parts price and a description of the coating technician fee/the material costs. FIGS. 23-24 is a drawing showing an example of a delivery note. According to the configuration, there are the following advantages.

1. The necessary part for a repair work is selected while looking at an illustration of the parts. Thereby, the parts are selected accurately, and a worker learns naturally the knowledge regarding the construction of the parts and the body structure which is indispensable to estimate.

2. According to the invention, an easy operation is possible because the information of the work items, the parts, including the illustrations are stored in the recording medium 1, for example, a CD-ROM. For example in a case that the recording medium 1 which is two pieces of CD-ROM, the information of the work items, the parts of over three hundreds car models are able to be stored. In this case, the contents of the recording medium 1 have only to be revised and renewed twice in a year.

It is not necessary to exchange a floppy disk according to a car model to be repaired and to renew a content, due to the use of a CD-ROM which has a large storage capacity as the recording-medium 1. Therefore, a simple operation is possible. This point is also an important advantage.

3. The information which are recorded in the recording medium 1 being, for example a CD-ROM are accurate. As a work data, the work items and the work operation times which are labor times are provided. As a work operation time, the operation times agreed between insurance companies and the trade group of car repair are used in principle. When there is not a work item necessary for a repair work, an original work items which are previously investigated are provided. Further, data of coating work are also original. The data is composed of data of the coating work items, the work operation times and the material prices. As a parts data, for example reference numbers, part names, part numbers, standard prices, which are correspondent to an illustration displayed on a screen are provided.

4. The original concept of the section is adopted in order to retrieve a large quantity of data efficiently. The concept is based on the method of dividing a whole body into 40-80 sections and of selecting the work items and the parts at every sections.

5. In the details of the operation, there are many advantages in the invention in order to make out a high quality estimate, further in an estimate itself there are many advantages in order to be useful for economization of an office work. To select data of a repair work item and the part of the table again, that is, it is possible as shown in FIGS. 25-27 to return from a screen showing a table of the repair work item and the part to a selection menu of the repair work item and the part at every section, or a selection menu of the section, or a selection menu of the damage type, and select additionally or select again from the beginning.

FIG. 25 is a drawing showing a display screen for correcting the description of the repair technician fee. FIG. 26 is a drawing showing a display screen for correcting the description of the part price. FIG. 27 is a drawing showing a display screen for correcting the description of a coating technician fee and the material cost. It is possible to return to the screen as shown in FIGS. 6, 8, 9 and 10 from the screen as shown in FIG. 17, it is also possible to return to the screen as shown FIG. 26 to the screen as shown in FIG. 6, 8 and 10. Further, it is also possible to return to the screen as shown in FIG. 12 or the screen as shown in FIG. 11 from the screen as shown in FIG. 27.

Figure 28:
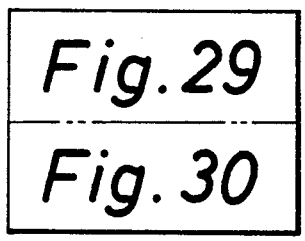
Figure 29:
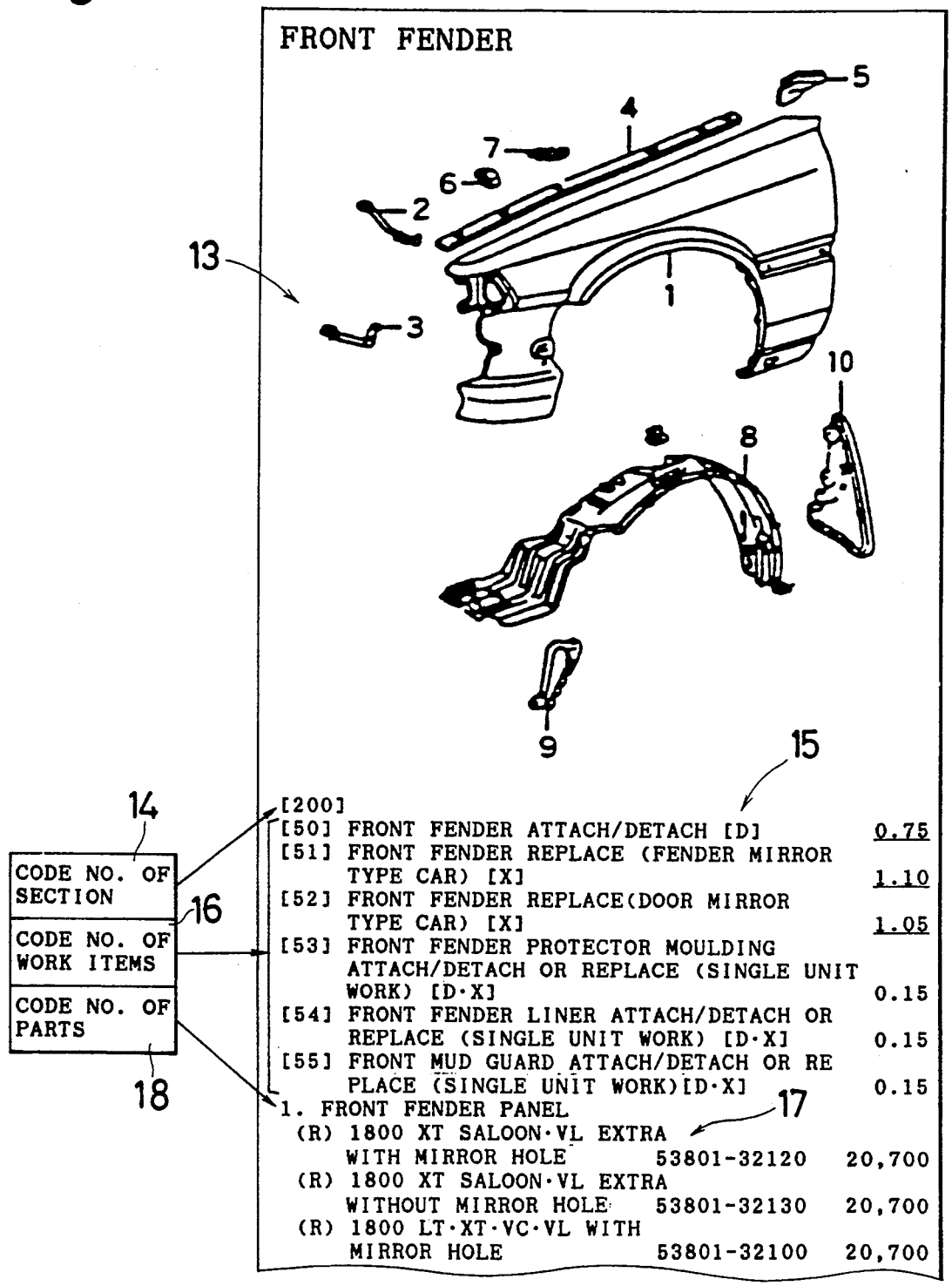

Further, every screen display format has a conformity in the invention. As a direction regarding operation, a next operation is directed by blinking the column which should be inputted. The explanation of a function key included in the input means 6 is displayed at the lower part on a screen. Thereby, an estimator is able to master an operation easily, without an operation manual and without other's help, so that time and cost required for a study of an estimate are reduced. According to another configuration, the invention is able to select the part data and repair work item by inputting a code number. As shown in FIG. 28-30, on sheets of a booklet for example a magazine, a drawings of parts 13, code numbers of sections 14 including the parts, repair work items 15, code numbers of repair work items 16, part names 17, code numbers of parts 18 are described. These sheets are made of, for example a paper and the sheets are able to be sold as an estimating manual which is, for example a booklet. An estimator inputs a code number described on the sheets by the input means 6. By this operation, the screen as shown in FIG. 31 are displayed, whereby the operation time is displayed at the same time, so that an operation for estimate is easily carried out.

Further, according to the invention, the invention has a function to make out a sales slip which is also a delivery note by making use of a price data of an estimate. The price data is transferred from a recording medium (a floppy disk or a hard disk) 7 for an ordinary processing to a recording medium (floppy disk) 7 for storing data. Thereby, efficiency of using the recording medium 7 for ordinary processing is improved and a processing speed in the invention is maintained.

Further, in the embodiment of the invention, there are many advantages in processing accompanied with a collection and a representative payment of a tax and an insurance.

The collection and the representative payment of a specified tax, a car tax, a compulsory automobile liability insurance peculiar to the trade world should be counted not as general sales, but should be classified as tax and insurance. Generally, tax and insurance are counted up as the other charges which includes a procedure fee. On the contrary in the embodiment, tax and insurance are established as a different item from the procedure fee, thereafter a total of charge, the tax and the insurance are counted up as the other charge. Further, the tax and the insurance should be subtracted from gross sales, therefore counted as no-taxable of consumers tax on a sales slip.

The other charge is collected as a payment in advance customly in the trade world in accordance with the collection and the representative payment of the specified tax, the car tax and the compulsory automobile liability insurance as above mentioned.

According to the invention, by establishing a new item of the payment in advance in the estimate and the sales slip which is also the delivery note, an economy of office work is realized. Further, there exist an apparatus for management and calculation of sales which works individually on the processing circuit 3 without a particular operation when making out a sales slip. By a work of the apparatus, receiving money processing is automatically carried out. This is an unprecedented function.

In the invention, there are many advantages regarding division of sales accompanied with a payment of insurance and automatic processing of plural sales. In a repair of a car body, the cost is often paid from an automobile liability insurance. Sales price on a sales slip is able to be divided into a payment of automobile property damage liability insurance company, a payments of automobile physical damage insurance company and a payment of a car owner who is also a contractor of insurance.

Further, there exist an apparatus for management and calculation of sales which works individually on the processing circuit 3 corresponding to each payment without a particular operation when a sales slip is made out. According to the apparatus, sales processing is automatically carried out. This is also an unprecedented function.

The store capacity of the CD-ROM used in the invention is, for example 550 Mega bits, the information of about $1.1 \times 10^6$ pieces including a part name, a part number, a part price for making out a bill are stored in a single CD-ROM. Drawings of 57,000 parts which are plain views showing the shape of the part are also stored in a single CD-ROM.

Therefore, the following fact would be recognized: the information being necessary for calculating the repair cost of many car models are stored in one CD-ROM.

Especially, since a repair workhouse is a narrow space, a reduction of the number of CD-ROMs is desirable. According to the invention, the number of CD-ROMs is able to be reduced.

Further, although a new CD-ROM should be provided for a new car model when the new car model is sold, considering a number of new car models sold in a year in a U.S.A. market, only one or two CD-ROMs is enough to store the information of the new car models. Thereby the user's burden of handling a CD-ROM in the repair workhouse is reduced. Only one or two CD-ROMs satisfies the requirement for storing the information of the new cars.

The invention may be embodied in other specific forms without departing form the spirit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An apparatus for estimating a repair cost of a damaged car, comprising:

a processor;

an input device, operatively coupled to said processor, for inputting user instructions to said processor;

a display device, operatively coupled to said processor, having a display screen and responsive to said processor to display images on said display screen;

a CD-ROM, operatively coupled to said processor, having stored therein repair work data and coating work data associated with each of at least one car model, wherein said repair work data includes a plurality of car section data corresponding to respective plural car sections of the associated car model, each car section data including repair time information and repair part information for each of a plurality of car parts which make up the corresponding car section of the associated car model, and wherein said coating work data includes plural coating color and coating material information and coating time information associated with each part of the associated model for which an estimate of painting is necessary;

wherein said processor is responsive to said input device to select a region of the damaged car and to specify a degree of damage of the selected region, and then to display on said display device a listing of the plurality of car section data associated with the selected region of the damaged car having the specified degree of damage, and wherein said processor is further responsive to said input device to select at least one of the displayed plurality of car section data and to display on said display screen of said display device the repair time information and repair part information of the plurality of car parts of the selected car section data, and wherein said processor is further responsive to said input means to select at least one of plurality of car parts of the selected car section data and to calculate and display on said display device a car section repair cost according to the repair part information and repair time information of each selected car part of each selected car section data, and wherein said processor is further responsive to said input device to select a combination of a coating color and a coating material from among said coating color information and coating material information, respectively, and for calculating and displaying a coating cost for each selected car section in accordance with the selected combination of the coating color and coating material and the coating time information.

2. An apparatus as claimed in claim 1, wherein said processor is further responsive to said input device to specify a listing order in which the plurality of car section data associated with a selected region of the damaged car having the specified degree of damage are displayed.

3. An apparatus as claimed in claim 2, wherein said processor includes means for multiplying a repair time for each car section by a labor rate to obtain a labor cost for each car section.

4. An apparatus as claimed in claim 2, wherein said CD-ROM further includes image data for each of the plurality of car sections, and wherein said processor is responsive to the selection of a car section data by said input means to display the image data of the selected car section data on said display screen of said display device.

5. An apparatus as claimed in claim 2, further comprising a hard copy listing of a plurality of car parts and assigned parts numbers, and wherein said processor is responsive to a part number input by said input device to select a corresponding car part.

6. An apparatus as claimed in claim 2, wherein said processor includes means for displaying an operation procedure of said apparatus on said display screen of said display device, said operation procedure stored in a memory associated with said processor.

* * * * *